(12) United States Patent
Gault

(10) Patent No.: US 6,343,472 B1
(45) Date of Patent: Feb. 5, 2002

(54) MASTER CYLINDER WITH VARIABLE REFILL PASSAGE

(75) Inventor: Olivier Gault, Drancy (FR)

(73) Assignee: Bosch Sistemas de Frenado, S.L., Barcelona (ES)

( * ) Notice: Subject to any disclaimer, the term of this patent is extended or adjusted under 35 U.S.C. 154(b) by 0 days.

(21) Appl. No.: 09/424,750
(22) PCT Filed: Oct. 19, 1999
(86) PCT No.: PCT/FR99/02537
§ 371 Date: Nov. 29, 1999
§ 102(e) Date: Nov. 29, 1999
(87) PCT Pub. No.: WO00/23306
PCT Pub. Date: Apr. 27, 2000

(30) Foreign Application Priority Data

Oct. 20, 1998 (FR) .............................................. 98 13185

(51) Int. Cl.⁷ ................................................ B60T 11/28
(52) U.S. Cl. .......................................... 60/588; 60/589
(58) Field of Search .................................. 60/588, 589

(56) References Cited

U.S. PATENT DOCUMENTS

| | | | | |
|---|---|---|---|---|
| 2,152,350 A | * | 3/1939 | Gardner | 60/589 |
| 2,245,991 A | * | 6/1941 | Loweke | 60/588 |
| 3,487,641 A | * | 1/1970 | Hackett | 60/589 |
| 3,662,552 A | * | 5/1972 | Ochiai et al. | 60/589 |

* cited by examiner

Primary Examiner—F. Daniel Lopez
(74) Attorney, Agent, or Firm—Leo H. McCormick, Jr.; Warren Comstock

(57) ABSTRACT

A master cylinder having a body (1) pierced with a bore (100) that is partially closed by a guide ring (11). A piston (3) mounted to slide in the guide ring (11) and bore (100) to define a pressure chamber (4) within the bore (100). An inlet (2) having a filling duct (21) which connects the bore (100) with a source of hydraulic fluid having a low pressure when the piston (3) is in a position of rest. The filling duct (21) is located between a flared portion (104) of the bore (100) and a front edge (62) of a ring (6) which slides in the body (1) between the guide ring (11) and pressure chamber (4). The piston (3) and sliding ring (6) have respective a first stop (31) and a second stop (61) which allows the piston (3) to drive the sliding ring (6) along when the piston returns to a position of rest. When an input force is applied to move the piston (3) within the bore (100), a spring (7) acts on and urges the ring (6) away from the guide ring (11) to seal the filling duct (21) while protecting a sealing collar (92) carried by the piston (3) from damage that could occur by moving past the filling duct (21).

1 Claim, 2 Drawing Sheets

MASTER CYLINDER WITH VARIABLE REFILL PASSAGE

The present invention relates in general to master cylinders used as generators of hydraulic pressure in motor-vehicle braking systems.

More specifically, the invention relates to a hydraulic master cylinder of the type comprising: a body pierced with an axial bore of given diameter delimited by an at least partially cylindrical wall, a first end of which forms an opening that is partially shut off by a guide ring fixed to the body, and a second end of which is closed by an end wall, this body having a drilling forming an inlet for a hydraulic fluid at low pressure; a piston of cylindrical shape passing through the guide ring, mounted to slide axially in the bore between a position of rest and an extreme actuating position, and delimiting within the bore a variable-volume pressure chamber; an upstream sealing collar secured to the body and gripping the piston in a sealed manner; a downstream sealing collar secured to the piston and co-operating with this piston to shut off the pressure chamber in a sealed manner, the downstream collar being closer to the end wall of the body than is the upstream collar; at least a first spring applying to the piston a first axial force which urges it towards its position of rest; and a radial filling duct connecting the fluid inlet to the pressure chamber when the piston is in its position of rest.

BACKGROUND OF THE INVENTION

Master cylinders of this type are well known in the prior art, as illustrated, for example in U.S. Pat. No. 5,154,107.

In accordance with the teachings of this patent, the filling duct consists of a radial drilling which, insofar as it has a circular cross section, has to have a relatively large diameter so that it can correctly fulfil its intended function.

Now, this constraint on the one hand has the effect of increasing the axial length of the master cylinder, and on the other hand, has the effect of increasing the fatigue of the downstream collar at the point where this collar passes across the filling duct.

The present invention falls within this context and aims to escape from the aforementioned constraint and the drawbacks it entails.

SUMMARY OF THE INVENTION

To this end, the master cylinder according to the invention, which in other respects is in accordance with the definition given in the above preamble, is essentially characterized in that an axially sliding ring surrounding the piston and of the same diameter as the bore is placed in the body between the guide ring and the pressure chamber, in that a second spring applies to the sliding ring a second axial force, lower in intensity than the first force, pushing the sliding ring back away from the guide ring, in that the piston and the sliding ring have respective stops which co-operate to allow the sliding ring to be driven axially by the piston when the piston returns to its position of rest, and in that the filling duct comprises an annular space of variable axial length defined between a front edge of the sliding ring and a flared portion of the axial bore, adjacent to this front edge.

Other features and advantages of the invention will emerge clearly from the description thereof given hereafter with no limitation implied, with reference to the appended drawings.

DETAILED DESCRIPTION OF THE INVENTION

Figure 1:
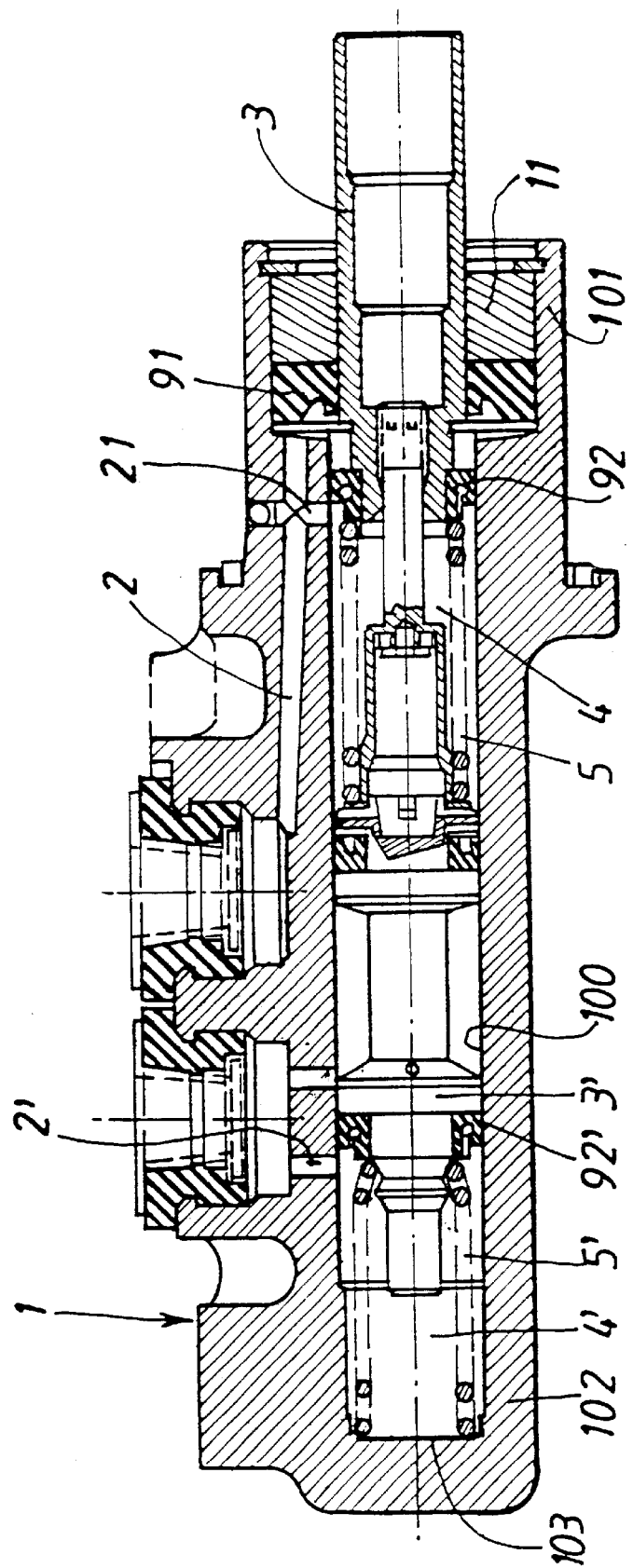
FIG. 1 is a sectioned view of the known master cylinder described in U.S. Pat. No. 5,154,107.

The invention relates to a hydraulic master cylinder mainly comprising a body 1, an inlet 2 for a hydraulic fluid at low pressure, a piston 3, a pressure chamber 4, an upstream sealing collar 91, a downstream sealing collar 92, a spring 5 and a radial filling duct 21.

As FIG. 1 shows, the aforementioned components may be duplicated as is well known in a secondary stage comprising comparable components such as 2', 3', 4', 5' and 92', when the master cylinder of the invention is a tandem master cylinder.

The body 1 is pierced with an axial bore 100 of given diameter and delimited by an at least partially cylindrical wall. A first end 101 of this wall forms an opening which is partially shut off by a guide ring 11 fixed to the body, and a second end 102 of this wall is closed by an end wall 103, the inlet 2 for hydraulic fluid consisting of a drilling in the body 1.

The piston 3, of cylindrical shape, passes through the guide ring 11 and is mounted to slide axially in the bore 100 between a position of rest illustrated in the figures, and an extreme actuating position that lies to the left of the position of rest, this piston 3 receiving from the spring 5 and from any other springs such as 5', an axial return force which urges it towards its position of rest.

The piston 3 delimits within the bore 100 a pressure chamber 4, the volume of which can vary and decreases as the piston 3 moves from its position of rest towards its extreme actuating position.

The upstream sealing collar 91 is secured to the body and tightly grips the piston 3 in a sealed manner, while the downstream sealing collar 92, which is closer to the end wall 103 of the body than is the upstream collar 91, is secured to the piston 3 and co-operates with the latter to shut off the pressure chamber 4 in a sealed manner.

The function of the radial filling duct 21 is to connect the fluid inlet 2 to the pressure chamber 4 when the piston 3 is in its position of rest, so as to guarantee that the pressure chamber can be filled with hydraulic fluid.

According to a first aspect of the invention (FIG. 2), a ring 6 is mounted to slide axially in the body 1, between the guide ring 11 and the pressure chamber 4, this ring 6 having a cylindrical internal bore of the same diameter as the bore 100 and surrounding the piston 3.

A spring 7 applies to the sliding ring 6 an axial force lower in intensity than the return force that urges the piston 3 towards its position of rest, and which pushes the sliding ring 6 back away from the guide ring 11.

Figure 2:
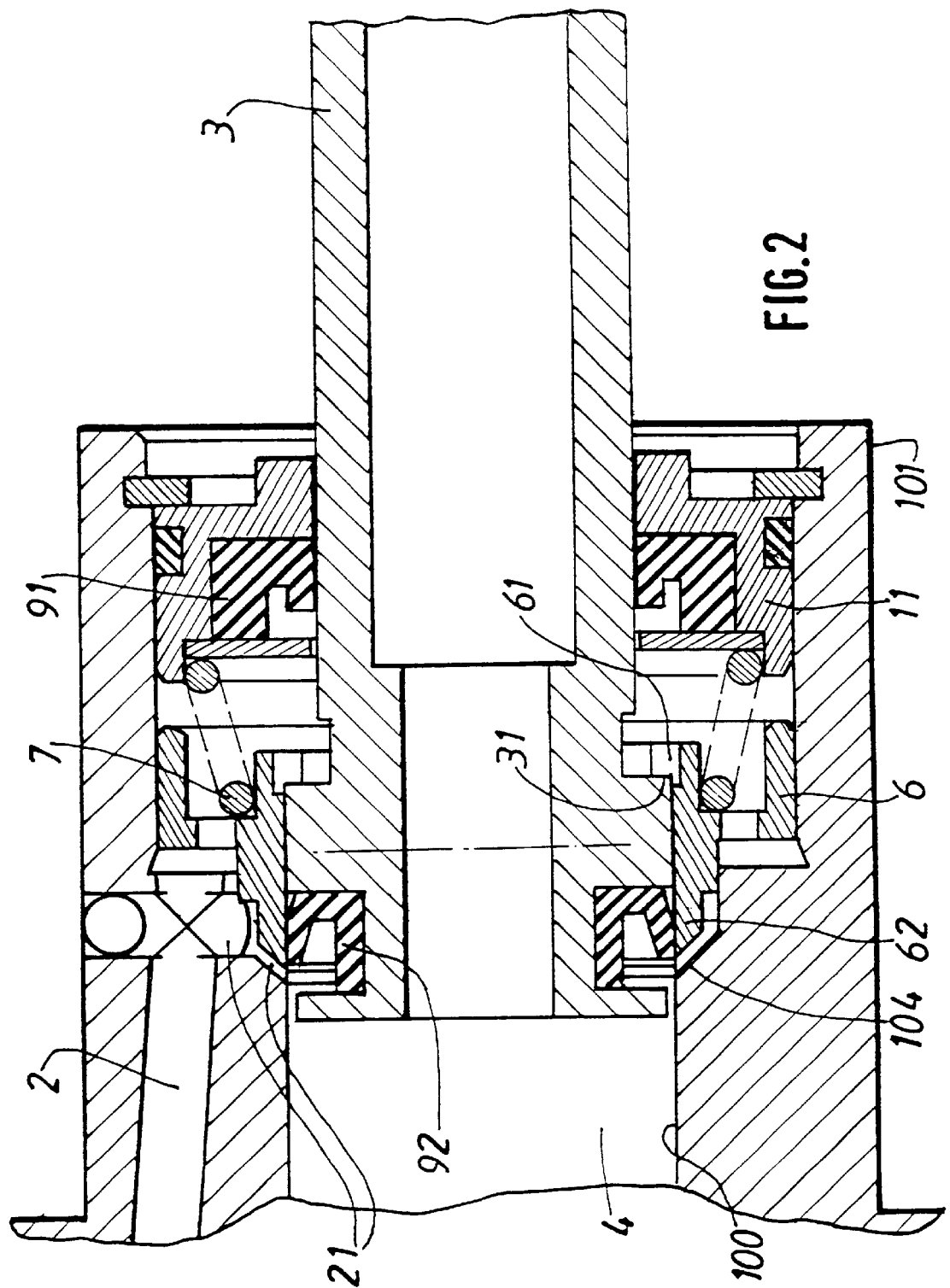
FIG. 2 is an enlarged sectioned view of the relevant details by which a master cylinder in accordance with the invention is distinguished from the master cylinder of FIG. 1.

The piston 3 and the sliding ring 6 have respective stops 31, 61 which co-operate to allow the piston 3, when it returns to its position of rest, to drive the sliding ring 6 along with it, compressing the spring 7 (the condition illustrated in FIG. 2).

Finally, the filling duct 21 comprises an annular space of variable axial length which is defined between the front edge 62 of the sliding ring 6 and a flared portion 104 of the axial bore 100, adjacent to this front edge 62.

The way in which the specific features of the master cylinder of the invention work is as follows.

When the master cylinder is not being actuated, that is to say when the piston 3 is subjected only to the return force exerted on it particularly by the spring 5, this piston is over to the right and adopts the position of rest illustrated in FIG. 2.

The return force exerted on the piston 3 is transmitted to the sliding ring 6 via the stop 31 of the piston and the stop 61 of the sliding ring 6, so that this ring is also over to the right and adopts the position illustrated in FIG. 2, in which the filling duct 21, which is annular in shape, is open and allows the pressure chamber 4 to be filled with hydraulic fluid.

When the piston 3 is actuated and moves to the left, the spring 7 can relax and therefore moves the ring 6 in the same direction, so that the filling duct 21 closes again.

By virtue of this arrangement, the filling duct 21 is completely closed when the collar 92 reaches the edge of the flared portion 104 of the axial bore 100, the collar thus encountering no obstacle likely to damage it because the ring 6 and the bore 100 have the same diameter.

I claim:

1. A master cylinder comprising:

a body pierced with an axial bore having a first diameter delimited from a second diameter by at least a partially cylindrical wall, said body having a first end that has an opening to said first diameter that is partially shut off by a guide ring fixed to said body and a second end that closes off said second diameter by an end wall, said body having a drilling forming an inlet in said first diameter for a hydraulic fluid with a low pressure;

a piston having a cylindrical shape which passes through said guide ring and is mounted to slide in second diameter of said axial bore between a position of rest and an extreme actuation position, said piston delimiting within said second diameter of said bore a variable-volume pressure chamber;

an upstream sealing collar secured to said guide ring and gripping said piston in a sealed manner to seal said first diameter of said bore;

a downstream sealing collar carried to said piston and selectively engaging said second diameter of said bore to shut off said variable volume pressure chamber in a sealed manner, said downstream collar being located between said upstream collar and said end wall;

a first spring acting on said piston with a first axial force to urge said piston toward a position of rest; and a radial filling duct for connecting said inlet to said variable-volume pressure chamber when said piston is located in said position of rest, said master cylinder is characterised in that an axially sliding ring has a first diameter corresponding to first diameter of said axial bore and a second diameter corresponding to said second diameter of said bore for receiving said piston, said sliding ring sliding in said first diameter of said axial bore between said guide ring and cylindrical wall; and in that a second spring acts to provide said sliding ring with a second axial force opposite to said first axial force for urging said sliding ring toward said cylindrical wall, and in that said piston has a first stop and said sliding ring has a second stop with said first stop engaging said second stop to allow first axial force to act on said sliding ring when said piston is driven axially toward said position of rest; and in that said filling duct comprises an annular space formed between a front edge of said sliding ring and a flared portion of said cylindrical wall, said filling duct having a variable length with a maximum length when said piston is located in said position of rest, said piston after said first axial force is overcome being moved by an input force toward said end wall and said sliding ring being moved by said second axial force toward said cylindrical wall such that said front edge engages said flared portion to completely close said filling duct before said downstream collar reaches said flared portion of said cylindrical wall and moves from said second diameter of said sliding ring into said second diameter of said bore to pressurize fluid in said variable-volume chamber to effect a brake application.

* * * * *